(12) United States Patent
Lyon (10) Patent No.: US 10,714,236 B2
(45) Date of Patent: Jul. 14, 2020

(54) CHARGING SYSTEM WITH COOLING TUBE

(71) Applicant: TE CONNECTIVITY CORPORATION, Berwyn, PA (US)

(72) Inventor: Zachary Wood Lyon, Lewisville, NC (US)

(73) Assignee: TE Connectivity Corporation, Berwyn, PA (US)

( * ) Notice: Subject to any disclaimer, the term of this patent is extended or adjusted under 35 U.S.C. 154(b) by 0 days.

(21) Appl. No.: 16/007,407

(22) Filed: Jun. 13, 2018

(65) Prior Publication Data

US 2019/0385765 A1 Dec. 19, 2019

(51) Int. Cl.
| | |
|---|---|
| *H02J 7/00* | (2006.01) |
| *H01B 7/42* | (2006.01) |
| *B60L 53/14* | (2019.01) |
| *H01B 9/02* | (2006.01) |

(52) U.S. Cl.
CPC .............. *H01B 7/426* (2013.01); *B60L 53/14* (2019.02); *H01B 7/423* (2013.01); *H01B 9/02* (2013.01); *H02J 7/00* (2013.01); *H02J 7/0042* (2013.01); *B60L 2230/12* (2013.01)

(58) Field of Classification Search
CPC ....... Y02E 60/12; H02J 7/0042; H02J 7/0045; H01M 10/46; H01M 10/44
See application file for complete search history.

(56) References Cited

U.S. PATENT DOCUMENTS

| | | | |
|---|---|---|---|
| 5,670,860 A | 9/1997 | Conrady et al. | |
| 2009/0273310 A1* | 11/2009 | Flack | H01R 24/38 320/107 |
| 2015/0217654 A1* | 8/2015 | Woo | B60L 11/1818 320/109 |
| 2017/0341524 A1 | 11/2017 | Heiss et al. | |

FOREIGN PATENT DOCUMENTS

| | | |
|---|---|---|
| DE | 102010050562 B3 | 4/2012 |
| DE | 102016204895 A1 | 9/2017 |
| EP | 0562331 A2 | 9/1993 |

OTHER PUBLICATIONS

International Search Report, International Application No. PCTIB2019/054719, International Filing Date, Jun. 6, 2019.

* cited by examiner

*Primary Examiner* — Arun C Williams (57) ABSTRACT

A charging system includes a power cable and a cooling tube. The power cable extends from a charging inlet to a battery pack to electrically connect the charging inlet to the battery pack. The charging inlet is configured to releasably couple to a mating connector of an external power source. The power cable includes a conductive core, an insulating layer surrounding the conductive core, and a metallic shield layer surrounding the insulating layer. The cooling tube is connected to a heat sink and extends along a length of the power cable. The cooling tube engages the metallic shield layer of the power cable to transfer heat from the power cable to the heat sink.

21 Claims, 6 Drawing Sheets

CHARGING SYSTEM WITH COOLING TUBE

BACKGROUND

The subject matter herein relates to electrical charging systems that have cooling tubes for thermal management.

Electric vehicles, including fully electric and plug-in hybrid vehicles, have charging systems for charging batteries that provide current used to propel the vehicles. The charging systems provide an electrically conductive pathway from a charging inlet on the vehicle to battery pack. The charging inlet removably couples to a mating connector of an external power source to establish an electrical connection for charging the battery pack. Because the vehicle is immobilized during charging operations, there is a desire to reduce the charging duration required to achieve a designated amount of charge in the battery pack to shorten the amount of time that the vehicle is immobile. The charging duration can be reduced by increasing the power transfer level (e.g., the electrical current and/or voltage). For example, some external power sources are configured to convey electrical power to a vehicle charging inlet at current levels in excess of 200 amperes (A).

At high power transfer levels, the components of the vehicle charging system may heat up due to electrical contact resistances. Increased temperatures of the charging system may have several unfavorable effects. For example, some of the components may become deformed and damaged due to high temperatures. The vehicle also may have a controller that monitors the temperature of the charging system. During a charging operation, if the controller detects that a temperature exceeds a threshold, the controller may be programmed to decrease the power transfer level, which unfavorably increases charging duration.

A need remains for a charging system that is able to dissipate heat to provide high power transfer levels over sustained periods of time for reducing charging durations.

SUMMARY

In one or more embodiments of the present disclosure, a charging system is provided that includes a power cable and a cooling tube. The power cable extends from a charging inlet to a battery pack to electrically connect the charging inlet to the battery pack. The charging inlet is configured to releasably couple to a mating connector of an external power source. The power cable includes a conductive core, an insulating layer surrounding the conductive core, and a metallic shield layer surrounding the insulating layer. The cooling tube is connected to a heat sink and extends along a length of the power cable. The cooling tube engages the metallic shield layer of the power cable to transfer heat from the power cable to the heat sink.

In one or more embodiments, an electrical power terminal is provided that includes a charging inlet, a power cable, and a cooling tube. The charging inlet includes an electrical power terminal. The charging inlet is configured to releasably couple to a mating connector of an external power source to electrically connect the power terminal to the mating connector. The power cable has a first end mechanically and electrically connected to the power terminal and a second end connected to a battery pack to electrically connect the charging inlet to the battery pack. The power cable includes a conductive core, an insulating layer surrounding the conductive core, and a metallic shield layer surrounding the insulating layer. The cooling tube is connected to a heat sink and extends along a length of the power cable. The cooling tube engages the metallic shield layer of the power cable between the charging inlet and the battery pack to transfer heat from the power cable to the heat sink.

In one or more embodiments, a charging system is provided that includes a charging inlet, a power cable, and a cooling tube. The charging inlet includes an electrical power terminal that defines a port therethrough. The charging inlet is configured to releasably couple to a mating connector of an external power source to electrically connect the power terminal to the mating connector. The power cable has a first end mechanically and electrically connected to the power terminal at a location spaced apart from the port and a second end connected to a battery pack to electrically connect the charging inlet to the battery pack. The power cable includes a conductive core, an insulating layer surrounding the conductive core, and a metallic shield layer surrounding the insulating layer. The cooling tube is connected to a heat sink and extends from the heat sink along a length of the power cable to the charging inlet. The cooling tube engages the metallic shield layer of the power cable to absorb heat from the power cable. A segment of the cooling tube at the charging inlet projects into the port of the power terminal to absorb heat from the power terminal.

DETAILED DESCRIPTION

Figure 1:
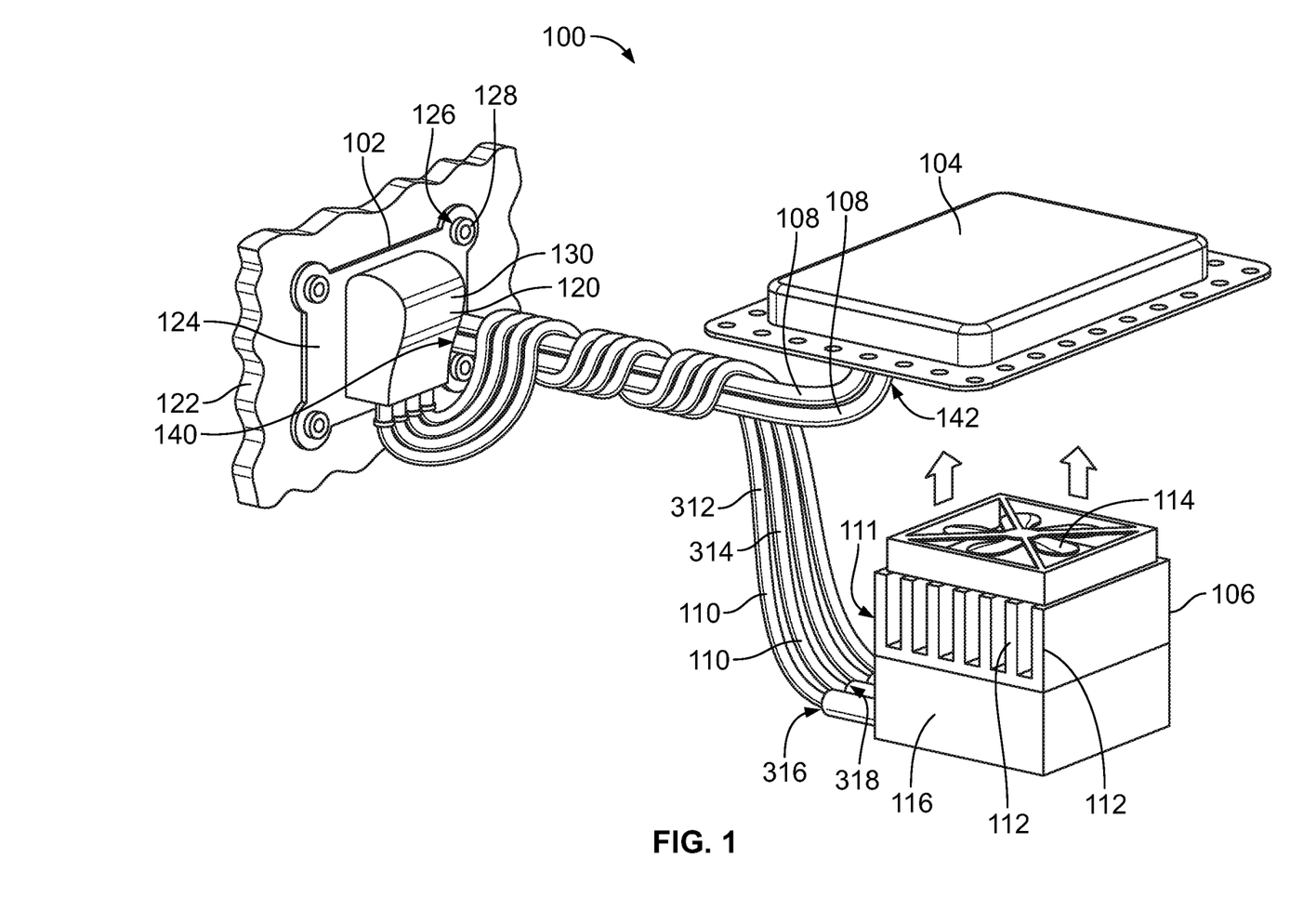
FIG. 1 illustrates a charging system according to an embodiment.

FIG. 1 illustrates a charging system 100 according to an embodiment. The charging system 100 includes a charging inlet 102, a battery pack 104, a heat sink 106, power cables 108, and cooling tubes 110. The power cables 108 extend from the charging inlet 102 to the battery pack 104 to electrically connect the charging inlet 102 to the battery pack 104. For example, a first end 140 of each power cable 108 may be mechanically and electrically connected to the charging inlet 102, and an opposite second end 142 of the power cable 108 may be mechanically and electrically connected to the battery pack 104. The cooling tubes 110 are connected to the heat sink 106 and extend along a length of the power cables 108. The cooling tubes 110 extend all the way to the charging inlet 102 in the illustrated embodiment, but may not extend fully to the charging inlet 102 in an alternative embodiment. The charging system 100 may be mounted onboard a vehicle, a vessel, or another type of mobile electric machine. For example, the charging system 100 may be mounted onboard an electric vehicle, such as the vehicle 202 shown in FIG. 2. Alternatively, the charging system 100 may be disposed within a building, such as a manufacturing facility.

The charging system 100 is designed to convey high power electrical energy (e.g., current) from the charging inlet 102 to the battery pack 104 through the power cables 108 to charge the battery pack 104. The battery pack 104 includes one or more battery cells. The cooling tubes 110 and heat sink 106 provide cooling circuits for dissipating heat from the power cables 108 and/or the charging inlet 102 to thermally control and manage the charging operation. The charging system 100 may be able to convey electric current up to or exceeding 400 A. The high current power transfer generates heat within the charging inlet 102 and along the power cables 108 due to electrical resistances of the current-carrying conductors. The amount of heat generated increases with greater power transfer rates (or levels). In one or more embodiments described herein, the cooling tubes 110 engage the power cables 108 at locations between the charging inlet 102 and the battery pack 104 to absorb and dissipate heat from the power cables 108. For example, the cooling tubes 110 in FIG. 1 are helically wrapped around the power cables 108 and engage the power cables 108 at multiple contact locations. The cooling tubes 110 transfer the heat via conduction and/or convection to the heat sink 106. The heat sink 106 is configured to dissipate and exhaust the heat from the cooling tubes 110. In illustrated embodiment, the cooling tubes 110 are connected to the charging inlet 102 and may absorb and dissipate heat from the charging inlet 102 as well as from the power cables 108.

The charging system 100 in FIG. 1 shows two power cables 108 and two cooling tubes 110. The charging system 100 may have additional power cables and/or data cables that are omitted in FIG. 1. Each of the cooling tubes 110 extends a first length from the heat sink 106 to the charging inlet 102, and loops back at the charging inlet 102 to extend a second length to the heat sink 106. The charging system 100 in other embodiments may have a different non-zero number of power cables 108 and/or charging tubes 110 than shown in FIG. 1. For example, the charging system 100 may simply have one power cable 108 and one cooling tube 110.

The heat sink 106 may be a passive or active device. In the illustrated embodiment, the heat sink 106 includes an array 111 of heat exchanger fins 112 and a fan 114 mounted on the array 111. The fan 114 is actively powered to move air through the heat exchanger fins 112. Optionally, the heat sink 106 may be operably connected to the battery pack 104 to support thermal management of the battery pack 104. For example, the heat sink 106 may be positioned proximate to the battery pack 104, and the fan 114 may force air towards the battery pack 104 to support cooling of the battery pack 104. In the illustrated embodiment, the heat sink 106 is disposed underneath the battery pack 104 and blows air upward towards the battery pack 104. The heat sink 106 optionally includes a fluid pump 116 that is actively controlled to pump a working fluid, such as water or a refrigerant, through the cooling tubes 110. For example, heat absorbed by the working fluid at the charging inlet 102 and/or the power cables 108 may be transferred to air and/or the structure of the heat sink 106 at the heat sink 106, and the fan 114 encourages the dissipation of the heat from the heat sink 106. The array 111 of fins 112 is stacked between the fan 114 and the fluid pump 116 in the illustrated embodiment.

The heat sink 106 may have different components and/or configurations in other embodiments. For example, in one alternative embodiment, the heat sink 106 may be entirely passive, such as including only the array 111 of fins 112 operably coupled to the cooling tubes 110. The heat sink 106 could potentially be any structure or device, such as a vehicle chassis, that is at a lower temperature than the charging inlet 102 and the power cables 108, such that a temperature gradient exists that allows for heat transfer towards the heat sink 106.

The charging inlet 102 is designed to releasably couple to a mating connector of an external power source to establish an electrical connection for conducting current from the external power source to the battery pack 104. FIG. 1 shows a back side 120 of the charging inlet 102. The charging inlet 102 has a mating interface along a front side 302 (shown in FIG. 3) that is opposite the back side 120. The mating interface engages and couples to the mating connector. The charging inlet 102 is mounted to a panel 122 in the illustrated embodiment. The panel 122 may be a body panel of a vehicle, a vehicle frame or chassis, or the like. The charging inlet 102 includes a mounting flange 124 with defined apertures 126. The apertures 126 receive fasteners 128 therethrough to mount the charging inlet 102 to the panel 122. The fasteners 128 may be screws, bolts, rivets, or the like. The charging inlet 102 includes a cover 130 along the back side 120 which encases various electrical components of the charging inlet 102. The power cables 108 extend into the cover 130 to mechanically engage and electrically connect to electrical power terminals 304 (shown in FIG. 3) of the charging inlet 102 that are disposed within the cover 130. Optionally, the cooling tubes 110 may also extend into the cover 130, as shown in FIG. 1, to absorb heat from the charging inlet 102. In an embodiment, the cooling tubes 110 may also engage the electrical power terminals 304 within the cover 130 to absorb heat from the power terminals 304.

Figure 2:
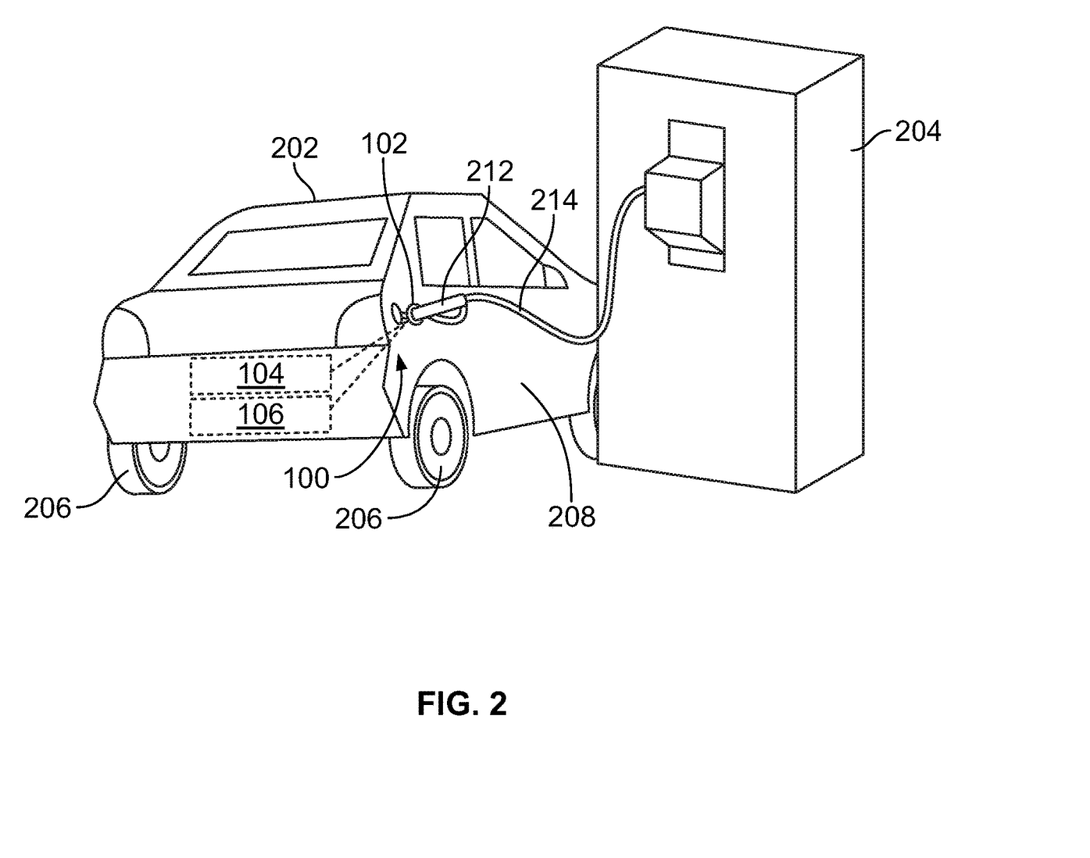
FIG. 2 illustrates an example application of the charging system installed on an electric vehicle according to an embodiment.

FIG. 2 illustrates an example application of the charging system 100 installed on an electric vehicle 202 according to an embodiment. FIG. 2 shows the electric vehicle 202 parked next to a charging station 204. The battery pack 104 and the heat sink 106 are mounted onboard the electric vehicle 202, and are schematically illustrated as boxes in FIG. 2. The battery pack 104 provides electrical power to a traction motor (not shown) that generates tractive effort to the drivetrain and wheels 206 for propelling the vehicle 202. Optionally, the traction motor may be selectively functional as a generator when tractive effort is not desired, such as when driving downhill, to generate electrical energy for charging the battery pack 104 using regenerative braking. The electric vehicle 202 may be a fully electric vehicle that lacks a combustion engine, a plug-in hybrid that includes both a combustion engine and the battery pack 104, or the like.

The charging inlet 102 of the charging system 100 is mounted to a side 208 of the vehicle 202. In the illustrated embodiment, the charging inlet 102 is coupled to a mating connector 212 of the charging station 204. The charging station 204 represents an external power source that is used to charge the battery pack 104. The mating connector 212 is a plug connector that is coupled to the charging station 204 via an electrical power cable 214. The coupling of mating connector 212 to the charging inlet 102 establishes a conductive pathway to conduct current from the charging station 204 to the battery pack 104. When the vehicle 202 is not proximate to a charging station 204, the charging inlet 102 may connect to other external power sources to charge the battery pack 104, such as home electrical outlets, external generators, and the like. Although FIG. 2 shows the charging system 100 installed on an electric passenger automobile 202, the charging system 100 may be installed on other types of transportation vehicles, such as buses, semi-trucks, marine vessels, or the like.

Figure 3:
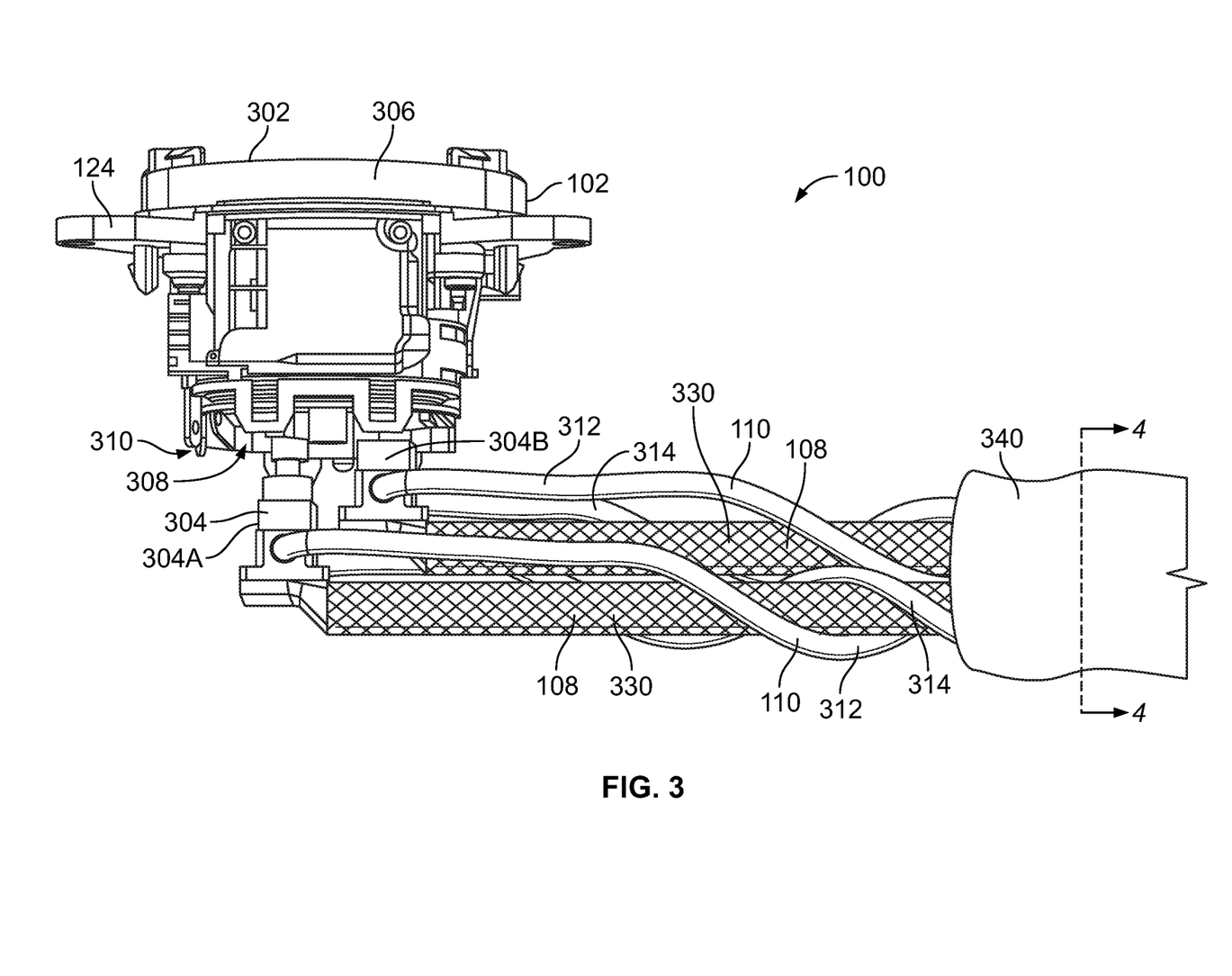
FIG. 3 is a top down view of a charging inlet and lengths of power cables and cooling tubes of the charging system according to an embodiment.

FIG. 3 is a top down view of the charging inlet 102 and lengths of the power cables 108 and the cooling tubes 110 of the charging system 100 according to an embodiment. The charging inlet 102 is shown without the cover 130 (shown in FIG. 1) to illustrate some of the internal components of the charging inlet 102. The charging inlet 102 includes a housing 306 and electrical power terminals 304. The mounting flange 124 may be a portion of the housing 306, or may be coupled to the housing 306. The housing 306 defines the front side 302 of the charging inlet 102 that couples to a mating connector, such as the mating connector 212 shown in FIG. 2.

Two electrical power terminals 304 are shown in FIG. 3. The electrical power terminals 304 extend into cavities 308 of the housing 306 from a rear end 310 of the housing 306. The power terminals 304 are configured to engage and electrically connect to complementary contacts on the mating connector. Portions of the power terminals 304 project beyond the rear end 310 of the housing 306 and engage the cooling tubes 110 and the power cables 108 outside of the housing 306. Optionally, the power terminals 304 may protrude different lengths beyond the rear end 310 of the housing 306. For example, a first power terminal 304A may project farther from the housing 306 than a second power terminal 304B, which may allow for offsetting the power cables 108 and the cooling tubes 110. The portions of the power terminals 304 that are visible in FIG. 3 may be enclosed by the cover 130 when the cover 130 is attached to the charging inlet 102.

Each of the power terminals 304 is mechanically secured to, and electrically connected to, a different one of the power cables 108. The power terminals 304 may be configured to convey high power electrical energy (e.g., high voltage, high current, etc.). In an embodiment, the power terminals 304 are direct current (DC) fast charge pins for conveying direct current at high power levels. The charging inlet 102 optionally includes other power terminals held within the housing 306 in addition to the power terminals 304. For example, the charging inlet 102 may include power terminals for conveying alternating current (AC) at reduced power transfer levels relative to the power levels conveyed along the power terminals 304. The other power terminals may be connected to power cables other than the power cables 108 shown in FIG. 3. The other power terminals optionally do not engage the cooling tubes 110.

In the illustrated embodiment, the cooling tubes 110 extend from the heat sink 106 (shown in FIG. 1) fully to the charging inlet 102 to absorb heat from the charging inlet 102. For example, the cooling tubes 110 engage the power terminals 304 to directly absorb heat from the power terminals 304. Each of the power terminals 304 mechanically engages a different one of the cooling tubes 110 in FIG. 3. The cooling tubes 110 loop around at the power terminals 304. For example, the segment of the cooling tubes 110 that engage the power terminals 304 may be U-shaped such that the cooling tubes 110 loop back around within the charging inlet 102. For a given fluid flow direction through the cooling tubes 110, each of the cooling tubes 110 includes a first length 312 upstream of the corresponding power terminal 304 and a second length 314 downstream of the corresponding power terminal 304.

With additional reference back to FIG. 1, each of the cooling tubes 110 has a first end 316 and a second end 318, and both of the first and second ends 316, 318 are at the heat sink 106. The first length 312 of each cooling tube 110 extends from the first end 316 of the cooling tube 110 at the heat sink 106 to the charging inlet 102 to convey a working fluid to the charging inlet 102. The second length 314 of each cooling tube 110 extends from the looped segment at the charging inlet 102 to the second end 318 of the cooling tube 110 at the heat sink 106 in order to transport the working fluid back to the heat sink 106 to dissipate the heat absorbed by the working fluid. The cooling tubes 110 therefore define cooling circuits between the heat sink 106 and the charging inlet 102. In an alternative embodiment, the cooling tubes 110 do not extend fully to the charging inlet 102 and do not engage the power terminals 304. In such an embodiment, the cooling tubes 110 extend along a length of the power cables 108 and absorb heat from the power cables 108 to thermally manage the charging system 100 without absorbing heat from the charging inlet 102.

As shown in FIGS. 1 and 3, the cooling tubes 110 engage the power cables 108 at locations spaced apart from the charging inlet 102 to absorb heat from the power cables 108 generated due to electrical resistances along the power cables 108. The cooling tubes 110 are helically wrapped around the power cables 108 in the illustrated embodiments shown in FIGS. 1 and 3. For example, the cooling tubes 110 may be flexible. The flexible property of the cooling tubes 110 may be attributable to the tubes 110 having a composition that includes a polymeric material. For example, the cooling tubes 110 may be composed of one or more polymers, such as polyethylene, polypropylene, and/or the like.

Referring now back to FIG. 3, the power cables 108 have metallic shield layers 330 that provide electrical shielding against induced currents caused by cross-talk, electromagnetic interference, or the like. The metallic shield layers 330 include one or more metals. The metallic shield layers 330 are braids in the illustrated embodiment, but may be metallic foils and/or the like in other embodiments. The cooling tubes 110 engage the metallic shield layers 330 of the power cables 108. For example, both the first lengths 312 (extending from the heat sink 106 towards the charging inlet 102) and the second lengths 314 (extending back to the heat sink 106) of the cooling tubes 110 may engage the metallic shield layers 330 at locations between the charging inlet 102 and the heat sink 106. The metallic shield layers 330 have relatively high thermal transmissivity, such that the metallic shield layers 330 readily transfer heat from the power cables 108 to the cooling tubes 110 (even if the cooling tubes 110 are not metallic). The helical wrapping of the cooling tubes 110 around the power cables 108 enable the cooling tubes 110 to engage the power cables 108 at a multitude of locations along the length of the power cables 108. The thermal transmissivity of the metallic shield layers 330 and the number of contact locations of the cooling tubes 110 on the power cables 108 enables significant heat transfer from the power cables 108 to the cooling tubes 110 to cool the power cables 108.

The magnitude of cooling may be controllable by adjusting the temperature and/or flow rate of the working fluid through the cooling tubes 110. For example, the cooling tubes 110 may absorb more heat from the power cables 108 by increasing the flow rate and/or reducing the temperature of the working fluid (which increases the temperature gradient). The heat sink 106 may be actively controlled to adjust the temperature and/or flow rate of the working fluid to thermally manage the charging system 100. For example, the fluid pump 116 (shown in FIG. 1) may be controlled to adjust the flow rate of the working fluid along the cooling circuits.

The charging system 100 may include an outer sheath 340 that surrounds the cooling tubes 110 and the power cables 108. The outer sheath 340 forces the cooling tubes 110 into sustained engagement (e.g., mechanical contact) with the metallic shield layers 330 of the power cables 108. In the illustrated embodiment, a single outer sheath 340 collectively surrounds both power cables 108 and both cooling tubes 110 (including the first and second lengths 312, 314 thereof). In an alternative embodiment, the charging system 100 may include two outer sheaths 340, and each outer sheath 340 surrounds only one of the power cables 108 and one of the cooling tubes 110. The outer sheath 340 may be have a fastener (not shown), such as a hook and loop or zipper, to secure the outer sheath 340 around the power cables 108 and the cooling tubes 110. Alternatively, the outer sheath 340 may be a heat shrink tubing or a tape that is wrapped around the power cables 108 and the cooling tubes 110.

Figure 4:
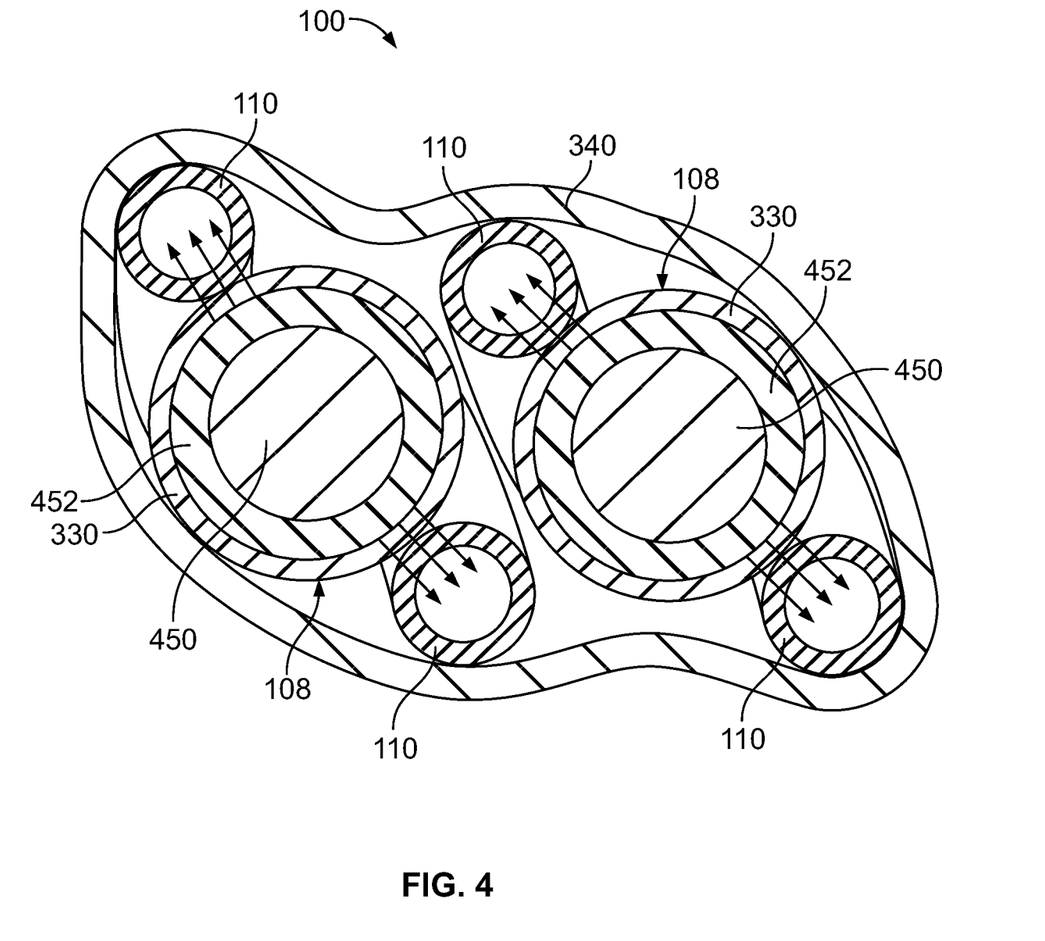
FIG. 4 is a cross-sectional view of the power cables, the cooling tubes, and an outer sheath of the charging system according to an embodiment.

FIG. 4 is a cross-sectional view of the outer sheath 340, power cables 108, and cooling tubes 110 of the charging system 100 according to an embodiment. The cross-section is taken along the line 4-4 in FIG. 3. Each of the power cables 108 includes a conductive core 450, an insulating layer 452 surrounding the conductive core 450, and the metallic shield layer 330 surrounding the insulating layer 452. The conductive core 450 is electrically conductive, and may be defined by one or more metallic wires. The core 450 is a solid metal wire composed of copper or the like in the illustrated embodiment, but may be defined by a plurality of smaller wires in an alternative embodiment. The insulating layer 452 includes an electrically insulating (e.g., dielectric) material, such as one or more plastics or other polymers.

The cooling tubes 110 are hollow in the illustrated embodiment, and may contain a working fluid therein. The working fluid may be water, a refrigerant, or the like. The cooling tubes 110 are polymeric in FIG. 4, but may be metallic in other embodiments. The outer sheath 340 engages the cooling tubes 110 and forces the cooling tubes 110 into contact with the metallic shield layers 330. Heat from the power cables 108 may be transported by the metallic shield layers 330 to the cooling tubes 110, as represented by groups of arrows in FIG. 4. Some of the transported heat may be absorbed by the working fluid within the cooling tubes 110. In an alternative embodiment, the cooling tubes 110 may be solid and may conductively transfer heat to the heat sink 106 (shown in FIG. 1) without the use of a working fluid.

Figure 5:
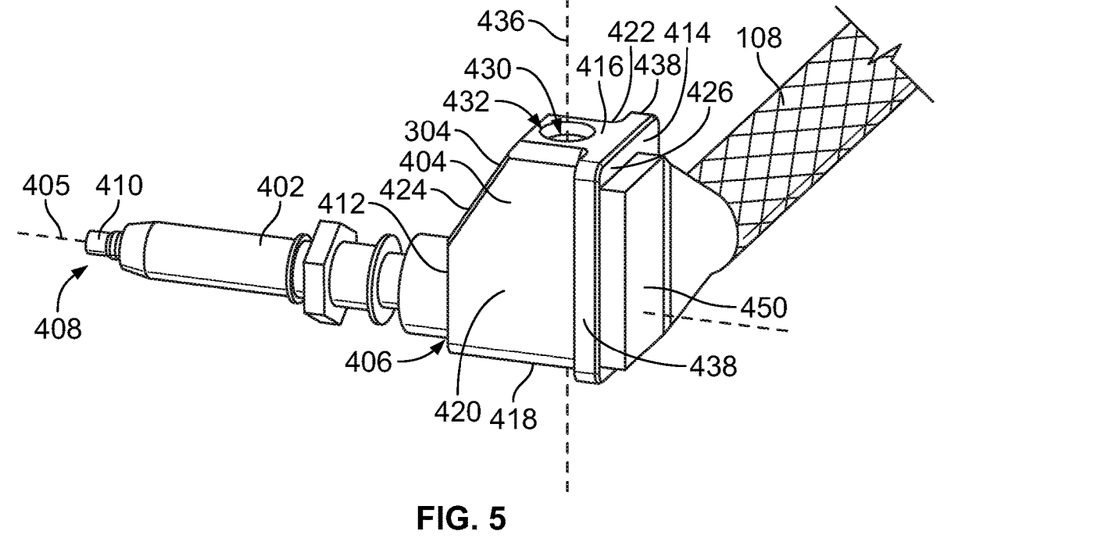
FIG. 5 is a perspective view of an electrical power terminal of the charging inlet and one of the power cables of the charging system according to an embodiment.

FIG. 5 is a perspective view of one of the electrical power terminals 304 and one of the power cables 108 of the charging system 100 (shown in FIG. 1) according to an embodiment. The electrical power terminal 304 shown in FIG. 4 may represent either of the power terminals 304 shown in FIG. 3. The power terminal 304 includes a pin 402 and a block 404. The pin 402 is an elongated shaft that has a proximal end 406 and a distal end 408 opposite the proximal end 406. The proximal end 406 is attached to the block 404, and the distal end 408 is spaced apart from the block 404. The pin 402 linearly extends along a pin axis 405 from the proximal end 406 to the distal end 408. The pin 402 may be generally cylindrical, and optionally has a varying diameter along the length of the pin 402 due to various features such as shoulders, collars, and the like. The pin 402 represents a contact of the charging inlet 102 for mechanically and electrically connecting to a complementary mating contact of a mating connector (e.g., the mating connector 212 shown in FIG. 2). The distal end 408 of the pin 402 may have any shape and size for securing to the complementary mating contact, such as a post 410 (as shown), a receptacle or socket, a planar blade, or the like.

The block 404 has a front side 412 and a rear side 414 opposite the front side 412. The pin 402 extends from the front side 412 of the block 404. For example, the proximal end 406 of the pin 402 is connected to the front side 412 of the block 404. The pin 402 may be removably or irremovably attached to the block 404. The block 404 has several outer sides that extend from the front side 412 to the rear side 414. For example, the block 404 has a first outer side 416 and a second outer side 418 opposite the first outer side 416. The block 404 also has a third outer side 420 and a fourth outer side 422 that is opposite the third outer side 420. In the illustrated orientation of the power terminal 304 shown in FIG. 4, the first outer side 416 is a top side and the second outer side 418 is a bottom side. As used herein, relative or spatial terms such as "front," "rear," "top," "bottom," "inner," and "outer" are only used to identify and distinguish the referenced elements in the illustrated figures and do not necessarily require particular positions or orientations relative to gravity and/or the surrounding environment of the charging system 100. The block 404 is optionally chamfered to include a slope surface 424 that extends from the front side 412 to the top side 416. The block 404 may have multiple slope surfaces or no slope surfaces in alternative embodiments. The block 404 optionally includes a flange or lip 438 at the rear side 414 that projects outward beyond the third outer side 420 and the fourth outer side 422. A portion of the rear side 414 is defined by the flange 438.

The block 404 includes a termination pad surface 426 that engages the conductive core 450 of the power cable 108 to electrically connect the power terminal 304 to the power cable 108. In an embodiment, the termination pad surface 426 is planar (e.g., flat) and is designed to enable mechanical coupling of the conductive core 450 to the block 404 via a chemical bonding process, such as welding, soldering, or the like. In a non-limiting example, the conductive core 450 of the power cable 108 is ultrasonically welded to the termination pad surface 426 to irremovably mechanically couple and electrically connect the power cable 108 to the power terminal 304. In the illustrated embodiment, the termination pad surface 426 is located on the rear side 414 of the block 404. The termination pad surface 426 is located opposite the front side 412, from which the pin 402 projects. Although the termination pad surface 426 is located on the rear side 414 in the illustrated embodiment, in an alternative embodiment the termination pad surface 426 may be on one of the outer sides, such as the third outer side 420 or the fourth outer side 422.

In the illustrated embodiment, the block 404 defines a port 430 through the block 404 that is spaced apart from the termination pad surface 426. Thus, the power cable 108 is mechanically and electrically connected to the power terminal 304 at a location spaced apart from the port 430. The port 430 is a cooling channel that is configured to receive one of the cooling tubes 110 (FIG. 3) therein to absorb and dissipate heat from the power terminal 304.

In the illustrated embodiment, the port 430 extends into the block 404 from a first opening 432 along the first outer side 416 (e.g., the top side). The port 430 linearly extends through the block 404 to a second opening (not shown) along the second outer side 418. The port 430 is elongated along a port axis 436. The port axis 436 may be parallel to a plane of the termination pad surface 426. Thus, as shown in FIG. 4, the port 430 does not interfere with the engagement between the conductive core 450 of the power cable 108 and the termination pad surface 426. The port axis 436 may be transverse, such as perpendicular, to the pin axis 405 defined by the pin 402. The port 430 may be spaced apart from the pin 402 and from the front side 412 of the block 404. In the illustrated embodiment, the port 430 is axially disposed between the pin 402 and the termination pad surface 426 along the pin axis 405, but does not intersect the pin 402 or the termination pad surface 426. For example, the port 430 is located between and spaced apart from each of the front side 412 and the rear side 414 of the block 404. Although the port 430 extends from the first outer side 416 (e.g., the top side) to the second outer side 418 (e.g., the bottom side) in FIG. 4, the port 430 in an alternative embodiment may extend from the third outer side 420 to the fourth outer side 422, or the like.

The power terminal 304 is composed of one or more metals. For example, the block 404, or at least the termination pad surface 426 thereof, may be composed of copper. The copper of the termination pad surface 426 may enable a strong welded connection to the conductive core 450 of the power cable 108 which may also be copper. For example, the similar compositions of the termination pad surface 426 and the conductive core 450 may enable a mechanically strong and electrically efficient welded connection with a low resistance at the interface. The termination pad surface 426 may be ultrasonically welded to the conductive core 450 of the power cable 108.

The power terminal 304 may be a unitary, monolithic component such that the pin 402 is integral to the block 404 without any seams or joints between the pin 402 and the block 404. Alternatively, the pin 402 and the block 404 may be discrete components that are coupled together to define the power terminal 304.

Figure 6:
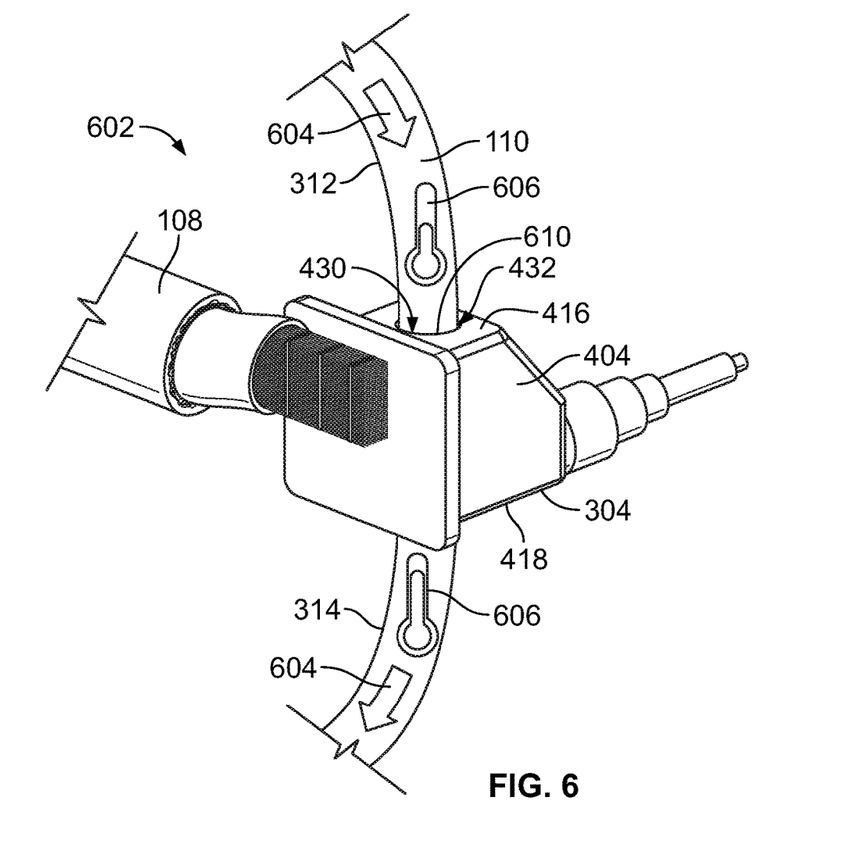
FIG. 6 is a rear perspective view of a terminal subassembly of the charging system according to an embodiment.

FIG. 6 is a rear perspective view of a terminal sub-assembly 602 of the charging system 100 (shown in FIG. 1) according to an embodiment. The terminal sub-assembly 602 includes one of the electrical power terminals 304 of the charging inlet 102 (shown in FIG. 3), one of the cooling tubes 110, and one of the power cables 108. In the illustrated embodiment, a segment 610 of the cooling tube 110 extends into the port 430 of the power terminal 304. The segment 610 is located between the first length 312 of the cooling tube 110 and the second length 314 of the cooling tube 110. The cooling tube 110 may extend continuously through the port 430, protruding from both the first opening 432 along the first outer side 416 (e.g., the top side) and the second opening (not shown) along the second outer side 418 (e.g., the bottom side). For example, the first length 312 of the cooling tube 110 projects from the first opening 432, and the second length 314 of the cooling tube 110 projects from the second opening.

The cooling tube 110 is configured to absorb heat from the block 404 of the power terminal 304 to manage the temperature of the power terminal 304 during charging operations. For example, the cooling tube 110 may contain a working fluid that flows through the cooling tube 110 in a first direction of flow 604 from the first length 312 through the port 430 into the second length 314 (and to the heat sink 106 shown in FIG. 1). The working fluid may be water, a refrigerant, air, or the like. The cooling tube 110 absorbs heat from the block 404, such that the second length 314 of the cooling tube 110 (and the working fluid therein) has a greater temperature than the first length 312 of the cooling tube 110 (and the working fluid therein), as indicated by the illustrated thermometers 606 in FIG. 6. The segment 610 of the cooling tube 110 within the port 430 may directly engage the block 404 directly or may be separated from the surfaces of the block 404 by a collar, fitting, bushing, or other member. For example, if the cooling tube 110 includes a metallic material, the cooling tube 110 may be electrically insulated from the block 404 of the power terminal 304 via an electrically insulative member within the port 430.

Alternatively, the cooling tube 110 may not contain a working fluid. For example, the cooling tube 110 may be solid and may transfer heat via conduction only (e.g., without convection). In another alternative embodiment, the cooling tube 110 may be a sealed heat pipe that includes a working fluid that undergoes phase transitions within the heat pipe to transfer heat away from the block 404. The heat pipe cooling tube 110 may have a sealed end that is located within the port 430 or projects slightly beyond the port 430. Instead of forming a loop through the port 430 to define the first length 312 and the second length 314, the heat pipe cooling tube 110 only has a single segment extending between the power terminal 304 and the heat sink 106. In the embodiment in which the cooling tube 110 is a heat pipe, the port 430 optionally may not extend fully through the block 404. For example, the block 404 may define only the first opening 432 for the port 430, and the port 430 may end within the block 404.

Figure 7:
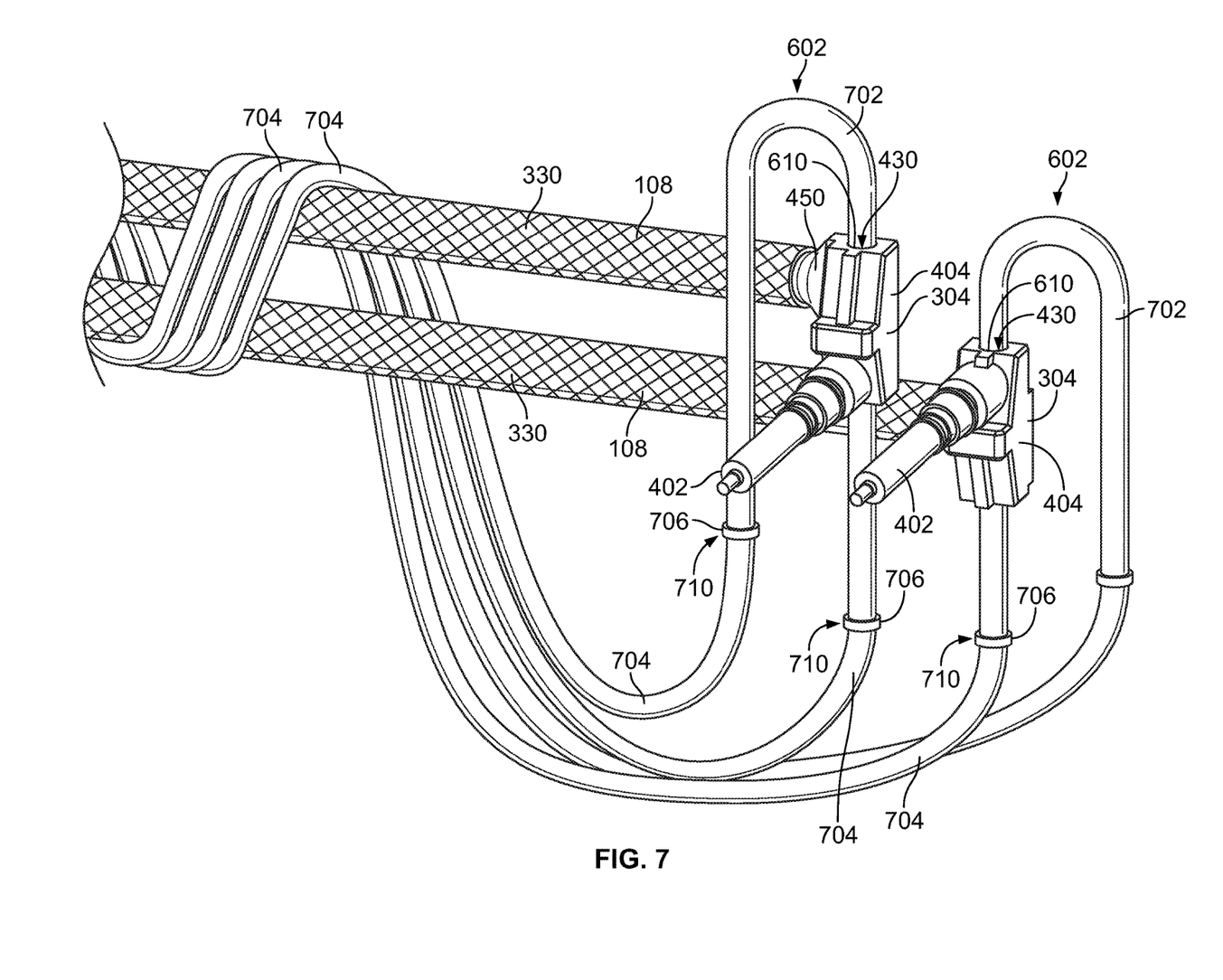
FIG. 7 is a front perspective view of two terminal subassemblies of the charging system according to an embodiment.

FIG. 7 is a front perspective view of two terminal sub-assemblies 602 of the charging system 100 (shown in FIG. 1) according to an embodiment. The blocks 404 of the electrical power terminals 304 have slightly different shapes than the blocks 404 shown in FIGS. 5 and 6. But, like the blocks 404 shown in FIGS. 5 and 6, the blocks 404 in FIG. 7 define ports 430 therethrough. The ports 430 are located between the pins 402 and the contact surfaces of the blocks 404 that engage the conductive cores 450 of the power cables 108

In an embodiment, the cooling tubes 110 have rigid segments 702 in and around the blocks 404. The rigid segments 702 include a metallic material. The rigid segments 702 include the segments 610 that extend into the ports 430 of the power terminals 304, as well as portions of the first and second lengths 312, 314 outside of the ports 430. The metallic material enables the rigid segments 702 of the cooling tubes 110 to absorb and conduct significant amounts of heat without melting or deforming due to the high temperature of the power terminals 304. The cooling tubes 110 in the illustrated embodiment also have flexible segments 704 that are connected to the rigid segments 702 at joints 710. The joints 710 are spaced apart from the power terminals 304. The flexible segments 704 include an electrically insulative polymeric material, such as one or more plastics. The flexible segments 704 are able to be helically wrapped around the power cables 108 to engage the metallic shield layers 330 at multiple locations along the length of the power cables 108.

The flexible segments 704 may break conductive pathways that extend from the power terminals 304 along the metallic rigid segments 702 of the cooling tubes 110 to prevent electrical current flow through the cooling tubes 110. The flexible segments 704 may be coupled to the ends of the rigid segments 702 via mechanical joining members 706, such a crimped O-ring joints, heat shrink sleeves, collars, or the like. In an alternative embodiment, the entire lengths of the cooling tubes 110 may be composed of a polymeric material that is configured to withstand the high temperatures within the ports 430 without melting or deforming.

At least one technical effect of the charging system 100 described herein is ability to thermally manage (e.g., cool) the power cables 108 during high power charging operations. For example, as the temperature of the power cables 108 rises, the active cooling circuit may increase the flow rate of the working fluid through the cooling tubes 110 to dissipate more heat from the power cables 108. By controlling the temperature of the power cables 108 utilizing the cooling tubes 110 that engage the metallic shield layers 330 of the cables 108, the charging system 100 may be able to transfer electrical energy at greater rates (e.g., greater voltages and/or currents) than known charging systems without damaging components or reaching designated upper temperature limits that automatically slows energy transfer rates in response. Another technical effect of the charging system 100 described herein is the ability to provide a required amount of performance during a charging operation utilizing smaller and/or cheaper components. For example, due to the cooling of the power cables 108, the charging system 100 may utilize smaller, lighter, cheaper power cables 108 than known charging systems to achieve the same or better results.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. Dimensions, types of materials, orientations of the various components, and the number and positions of the various components described herein are intended to define parameters of certain embodiments, and are by no means limiting and are merely example embodiments. Many other embodiments and modifications within the spirit and scope of the claims will be apparent to those of ordinary skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A charging system comprising:
    a power cable extending from a charging inlet to a battery pack to electrically connect the charging inlet to the battery pack, the charging inlet configured to releasably couple to a mating connector of an external power source, the power cable including a conductive core, an insulating layer surrounding the conductive core, and a metallic shield layer surrounding the insulating layer;
    a cooling tube connected to a heat sink and extending along a length of the power cable, the cooling tube engaging the metallic shield layer of the power cable to transfer heat from the power cable to the heat sink.

2. The charging system of claim 1, wherein the cooling tube is helically wrapped around the power cable.

3. The charging system of claim 1, further comprising an outer sheath that surrounds the power cable and the cooling tube to force the cooling tube into sustained engagement with the metallic shield layer.

4. The charging system of claim 1, wherein the cooling tube engages the metallic shield layer at multiple locations along the length of the power cable between the charging inlet and the battery pack.

5. The charging system of claim 1, further comprising the heat sink, wherein the heat sink includes a fluid pump that pumps a working fluid through the cooling tube to actively cool the power cable via the working fluid absorbing heat from the metallic shield layer.

6. The charging system of claim 1, further comprising the charging inlet, wherein the cooling tube defines a cooling circuit that extends from the heat sink to the charging inlet, the cooling tube engaging the metallic shield layer of the power cable between the charging inlet and the heat sink.

7. The charging system of claim 6, wherein the charging inlet includes an electrical power terminal mechanically and electrically connected to the power cable and configured to electrically connect to the mating connector, wherein the cooling tube extends through a port in the electrical power terminal to absorb heat from the electrical power terminal.

8. The charging system of claim 6, wherein a first length of the cooling tube extends from a first end of the cooling tube at the heat sink to the charging inlet and a second length of the cooling tube extends from the charging inlet to a second end of the cooling tube at the heat sink, wherein both the first and second lengths of the cooling tube engage the metallic shield layer of the power cable between the charging inlet and the heat sink.

9. The charging system of claim 1, wherein the cooling tube is flexible and includes a polymeric material.

10. A charging system comprising:
    a charging inlet including an electrical power terminal, the charging inlet configured to releasably couple to a mating connector of an external power source to electrically connect the power terminal to the mating connector;
    a power cable having a first end mechanically and electrically connected to a first surface of the power terminal and a second end connected to a battery pack to electrically connect the charging inlet to the battery pack, the power cable including a conductive core, an insulating layer surrounding the conductive core, and a metallic shield layer surrounding the insulating layer; and
    a cooling tube connected to a heat sink and extending along a length of the power cable to the charging inlet, the cooling tube engaging the metallic shield layer of the power cable between the charging inlet and the battery pack to transfer heat from the power cable to the heat sink, wherein a segment of the cooling tube engages a second surface of the power terminal to absorb heat from the power terminal.

11. The charging system of claim 10, wherein a first length of the cooling tube extends from a first end of the cooling tube at the heat sink to the charging inlet and a second length of the cooling tube extends from the charging inlet to a second end of the cooling tube at the heat sink, wherein both the first and second lengths of the cooling tube engage the metallic shield layer of the power cable between the charging inlet and the heat sink.

12. The charging system of claim 10, wherein the cooling tube has a rigid segment that includes a metallic material and the cooling tube has a flexible segment that includes a polymeric material, the rigid segment connected to the flexible segment at a joint, wherein the rigid segment represents the segment that engages the power terminal and the flexible segment engages the metallic shield layer of the power cable.

13. The charging system of claim 10, wherein the cooling tube is helically wrapped around the power cable.

14. The charging system of claim 10, further comprising an outer sheath that surrounds the power cable and the cooling tube to force the cooling tube into sustained engagement with the metallic shield layer.

15. The charging system of claim 10, wherein the cooling tube is flexible and includes a polymeric material.

16. A charging system comprising:
   a charging inlet including an electrical power terminal that defines a port therethrough, the charging inlet configured to releasably couple to a mating connector of an external power source to electrically connect the electrical power terminal to the mating connector;
   a power cable having a first end mechanically and electrically connected to the electrical power terminal at a location spaced apart from the port and a second end connected to a battery pack to electrically connect the charging inlet to the battery pack, the power cable including a conductive core, an insulating layer surrounding the conductive core, and a metallic shield layer surrounding the insulating layer; and
   a cooling tube connected to a heat sink and extending from the heat sink along a length of the power cable to the charging inlet, wherein the cooling tube engages the metallic shield layer of the power cable to absorb heat from the power cable and a segment of the cooling tube at the charging inlet projects through the port of the electrical power terminal to absorb heat from the electrical power terminal.

17. The charging system of claim 16, wherein the cooling tube has a rigid segment that includes a metallic material and the cooling tube has a flexible segment that includes a polymeric material, the rigid segment connected to the flexible segment at a joint, wherein the rigid segment represents the segment that projects through the port of the electrical power terminal and the flexible segment engages the metallic shield layer of the power cable.

18. The charging system of claim 16, wherein a first length of the cooling tube extends from a first end of the cooling tube at the heat sink to the charging inlet and a second length of the cooling tube extends from the charging inlet to a second end of the cooling tube at the heat sink, wherein both the first and second lengths of the cooling tube engage the metallic shield layer of the power cable between the charging inlet and the heat sink.

19. The charging system of claim 18, wherein the cooling tube conveys a working fluid along a cooling circuit from the heat sink through the first length of the cooling tube then through the segment that projects into the port of the electrical power terminal and finally through the second length of the cooling tube back to the heat sink.

20. The charging system of claim 1, wherein the power cable, the cooling tube, the battery pack, and the charging inlet are installed on an electric vehicle.

21. The charging system of claim 10, wherein the electrical power terminal includes a block and a pin extending from the block, wherein the first and second surfaces of the power terminal are discrete surfaces of the block.

* * * * *